Figure 14:
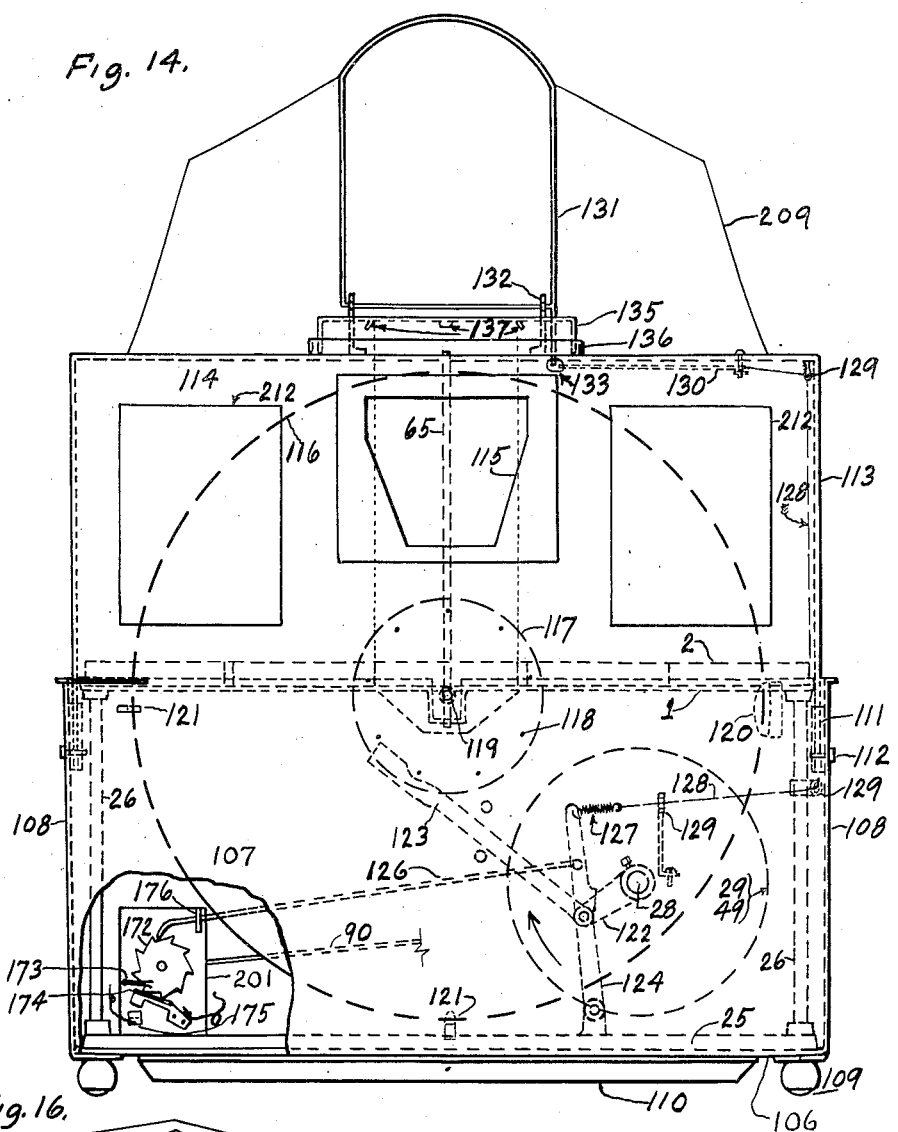

March 21, 1939.　　O. H. SCHOENBERGER　　2,151,303
DISPLAY MACHINERY
Filed Jan. 4, 1936　　5 Sheets-Sheet 1
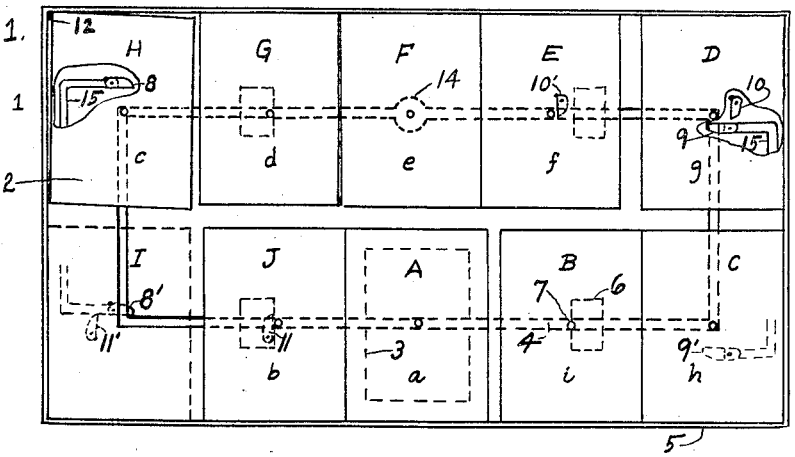
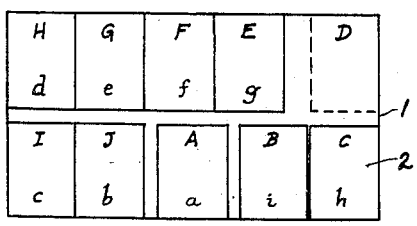
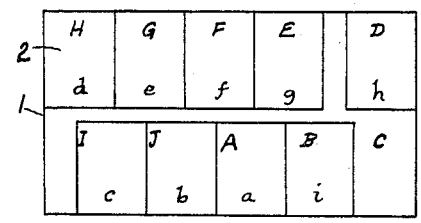
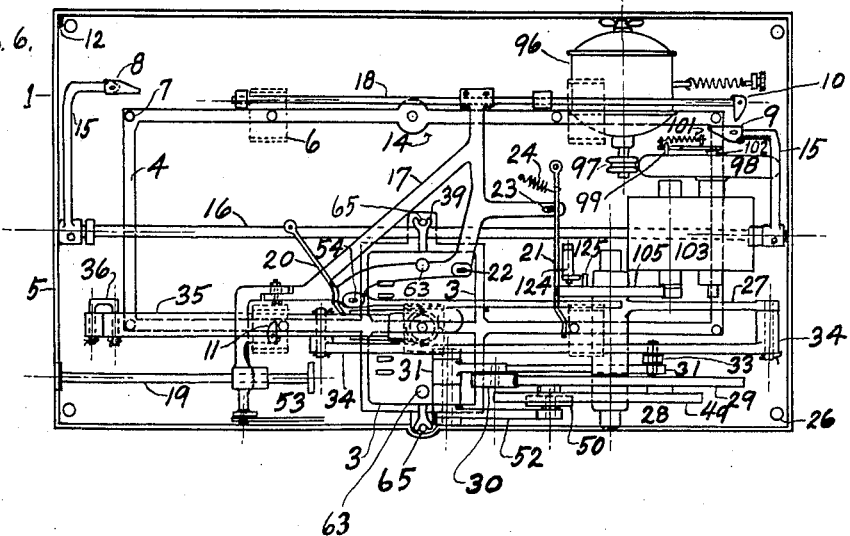
INVENTOR
Otto H. Schoenberger

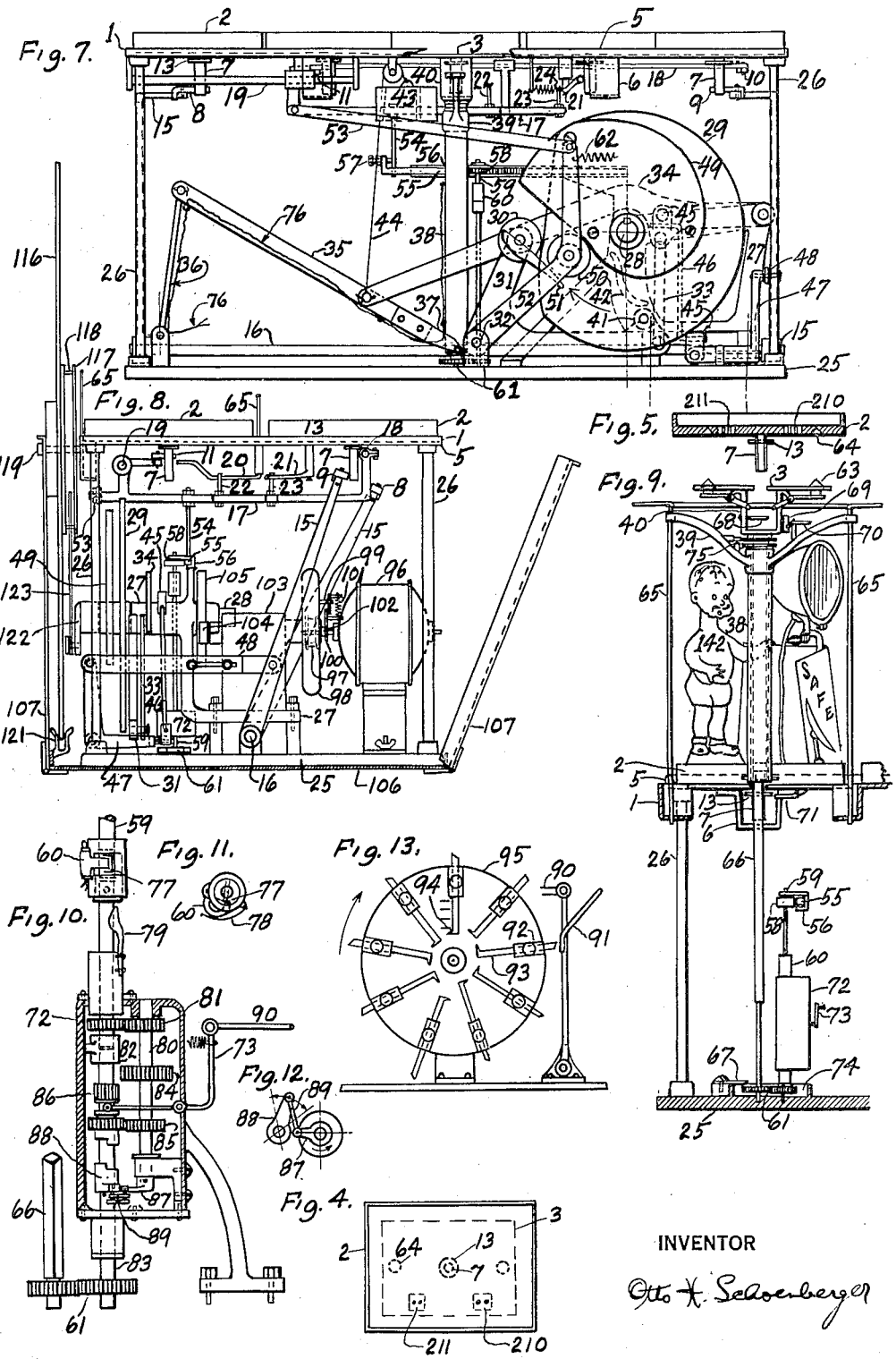

March 21, 1939. O. H. SCHOENBERGER 2,151,303
DISPLAY MACHINERY
Filed Jan. 4, 1936   5 Sheets-Sheet 3

INVENTOR.
Otto H. Schoenberger

March 21, 1939.　　O. H. SCHOENBERGER　　2,151,303
DISPLAY MACHINERY
Filed Jan. 4, 1936　　5 Sheets-Sheet 4
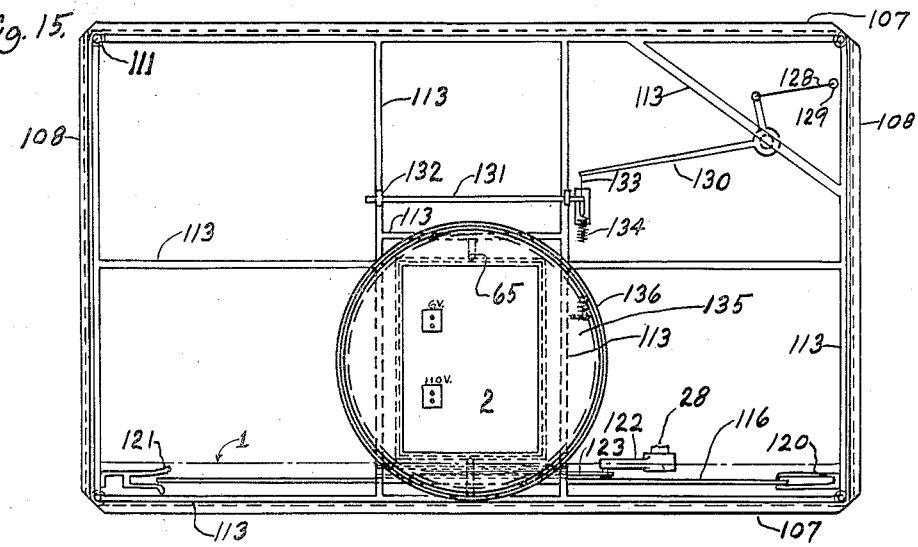
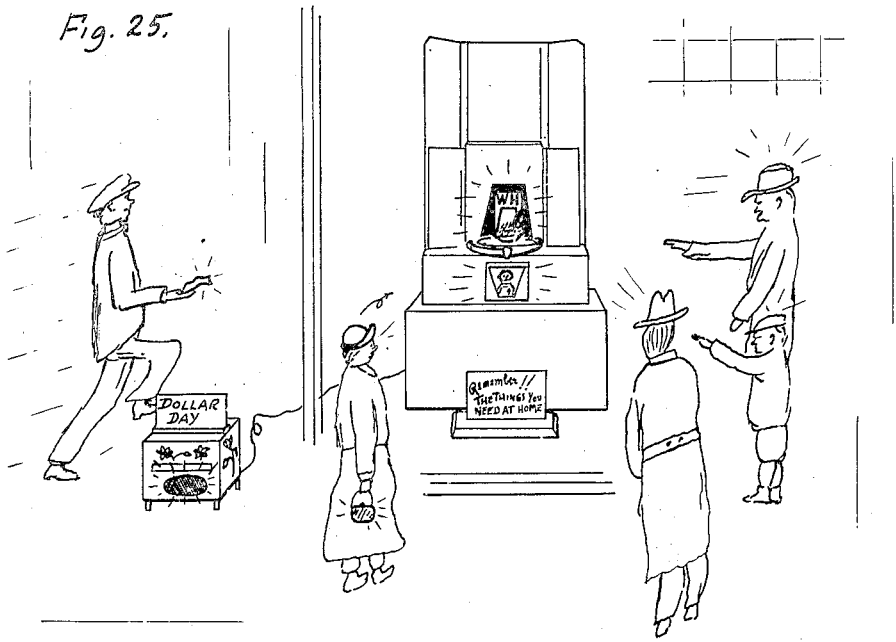
INVENTOR.
Otto H. Schoenberger

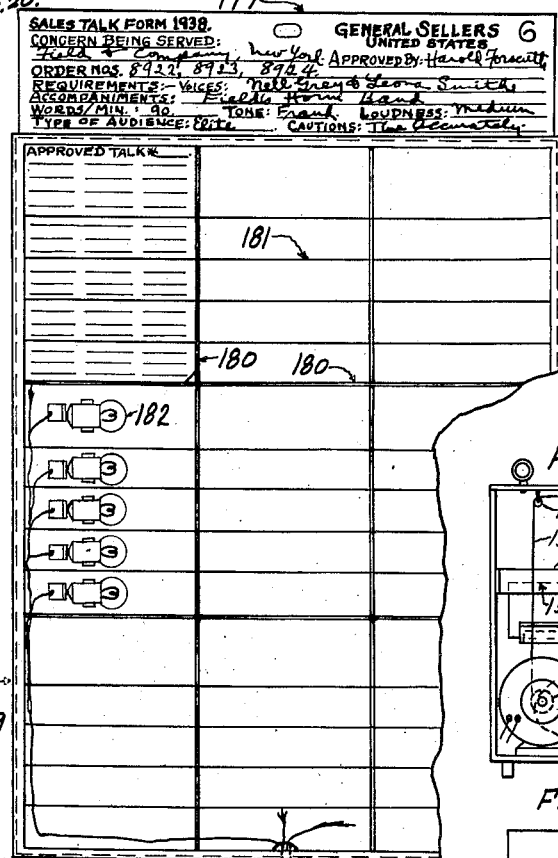

Patented Mar. 21, 1939

2,151,303

UNITED STATES PATENT OFFICE 2,151,303

DISPLAY MACHINERY

Otto Henry Schoenberger, Compton, Calif.

Application January 4, 1936, Serial No. 57,631

21 Claims. (Cl. 40—30)

My invention relates to a means whereby actual concrete items of merchandise or objects are displayed or demonstrated and described, or sold in displays, by automatic machinery.

By being "sold in displays" I mean that the true inherent values of the objects are to be imparted or conveyed in thoughts to the minds of the prospective customers in such a way that the prospective customers will obtain a true clear understanding of those values and will want to buy the objects so offered to them, and to pay a fair price for them.

My main object is to provide efficient economical machinery for mass marketing purposes to correlate with mass production, mass transportation and mass communication, and mass government; which machinery can be scientifically operated to coordinate the functions of object displaying with signs and sound, in integral psychological applications thereof.

This main object is divided into more specific objects: (1) to provide an economical effective honest coordinated versatile psychological sales power; (2) to provide adaptable means for handling a wide choice of worthy items with this sales power, to give the public opportunity for personal and efficient, wise, buying-selectivity; (3) to provide honest efficient means for the public to educate itself on the actual values and the merits of worthy merchandise; (4) to provide adaptable means for meeting stores' requirements universally; (5) to provide light-weight space-efficient practical equipment for mobile use; (6) to provide adjustable or designable psychologic features for exacting scientific application; and (7) to provide for quick and easy changeovers for creating new setups of the displays.

Obviously the underlying principles of this type of machinery are: First, to attract the attention of the buying, shopping traffic—the location, size, proportions, harmony of proportions, appearance, background, height, lighting, motions and accelerations and decelerations thereof, the speed, the type of store, the machine's audibility, its special attraction features, and so on, all take from or add to the significance of the display and its attraction. If it has attracted a healthy shopping crowd then the subsequent feature becomes important.

Second, the crowd must be cared for—the crowd must not block the sidewalk, it must not threaten to push in the windows, it must not be forced to crane and strain; everyone within reasonable distance should see the vital display from whatever angle of view they are standing comfortably. The height of the display and the range of view, and the distribution of the sound, are important here.

Third, the attention of the crowd must now be held, and focused on to the merchandise. The type, value, worthiness, appropriateness and appeal of the merchandise are now most important; The demonstration factors, psychologic motions, general psychology, and the audible sales talk given by my machinery are now salient features to the performance of the sale. Now the concrete worthy ideas must flow, from the machinery to the prospective customers. There must now be compelling concentration, and the sale must be closed as much as possible, with dignity.

Fourth, the sound of the sales talks must be clearly modulated and focused and distributed to reach all of the customers within the machinery's range of view of the display, and this sound must not extend to disturb neighboring places of business or to be a public nuisance.

Fifth, the display must be sufficiently intriguing with quality and its expression, with value and with attractive ideas, to take a fair percentage of the prospects in as customers. The quality and fair price and merit must themselves be good in order to emanate the display results, therefore another underlying principle is the genuine reliability factor upon which the public can rely, upon which sales can be repeated with confidence.

Figure 16:
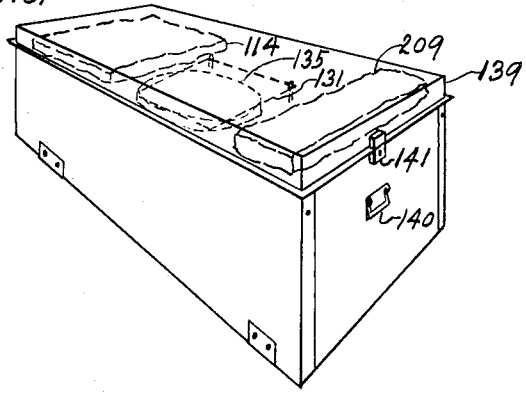

One form and expression of this invention is shown in the accompanying drawings, Figures 1 to 25. In the description following, their cooperation, versatility, psychologic functions, timing, and coordinations, will be shown, in which:

Figures 1, 2, and 3 are top views of the article carrying magazine to show the space-efficiency and the operation of the article supporting sections in said magazine; Fig. 4 is a top view of an article support; Fig. 5, a sectional elevation of an article support; Figure 6, a top view of the display element chassis; Fig. 7, a side elevation of this chassis; Fig. 8, an end elevation of this chassis; Fig. 9, an elevation of an elevator mechanism that may be employed in this arrangement; Fig. 10, a gear transmission used to drive a display turntable; Fig. 11, a top view of a rotary detent for operating said transmission; Fig. 12, a bottom view of a reciprocating mechanism used in said transmission; Fig. 13, an automatic gear shifter for controlling said transmission; Figure 14 shows a front elevation of the apparatus set up, showing the chassis in a foldable case with sign mechanism, coordinating switch, closure mechanism and psychological testing cards, to be described; Fig. 15 shows a top plan view of the folding case, with its closure and sign mechanisms; Figure 16, a machine as folded and encased for transportation; Figure 17 shows an elevational view of a special synchronizable automatic sound reproducer which is remotely controllable; Fig. 18, a plan view of the said sound reproducer; Fig. 19, a repeater switch for said sound reproducer; Fig. 20, a plan view of a manuscript synchronizing apparatus; Fig. 21, an end view of said synchronizing apparatus; Fig. 22, a plan of a special electrical distributor; Fig. 23, a cross-sectional view of said distributor; Figure 24, a wiring diagram; and Figure 25, a perspective view of the apparatus on location in public service.

In order that the fuller conception of this invention may be surmised the mechanical details should be jointly understood with the psychological principles where such principles apply, to derive how the psychologic functions may be performed by the mechanical means provided, in the detailed description following:

The panel 1 (Fig. 1) has a rectangular horizontal plane surface bounded by abutments 5, and a continuous slot 4. Panel 1 is divided into ten areas: A, B, C, D, E, F, G, H, I, and J, which are hereafter termed stages. Each stage except one, is covered with an article support 2, the series of these article supports being designated severally as a, b, c, d, e, f, g, h, and i.

The article supports 2 are arranged to be guided by the abutments 5, and the dogs 7 in the slot or raceway 4. Under the panel 1 is an actuating mechanism (Figs. 1 and 6) which operates pawls 8, 9, 10, and 11, which pawls engage on the dogs 7 respectively, and pull the article supports 2 from stage to stage successively in the alphabetical order of the stages, or anti-clockwise on the panel 1. 8', 9', 10' and 11' are the opposite positions of the respective pawls designated, which pawls reciprocate, viz. 8 to 8'.

Stage A is regarded as the psychologically-active stage, hereafter called the active stage. The supports 2 are successively brought into the active stage, in the order a, b, c, and so on, and are each and severally put through a special performance, while in the active stage, to demonstrate or dramatize merchandise or objects which are carried by the supports 2.

While in the active stage the supports 2 are elevated to display view, by means of elevator 3 which operates in timely reciprocal vertical psychologic motions, raising one support in display, there displaying the object carried, and then returning the support downward to pick up another by means of a positive transfer means provided.

It will be noted that nine supports 2 are closely positioned, with but one vacant space enabling the travel of the supports on the panel 1; enabling space efficiency and rectangular proportions as shown in the drawings.

See Fig. 1. Pawl 8 moves to 8', gripping the dog 7 of support c, moving c from H to I (as per dotted lines, stage I). Note the clearance, for this action, between I and J. The actuating mechanism then moves pawl 10 to the position 10', moving a row of supports, placing d in H, e in G, f in F, and g in stage E. The hump 12 on the inside of the abutment 5 causes the article support in H to tilt sidewise for subsequently steering this article support into the next stage I. Stage D is now vacant, shown in dotted lines in Fig. 2. In Fig. 2 note the clearances, exaggerated, between stages D and E, and on both sides of A. Now pawl 9 moves forward from 9', to its reciprocal extreme (as of Fig. 1) moving h into D, and C is now vacated. Incidentally a has been performing in the active stage during these movements of the article supports designated, and the support b is next transferred to A, and a to B, as is shown being done in Fig. 3 at this time—the actuating mechanism moves pawl 11 from 11' to the 11-position, moving c, b, a, and i forward (Fig. 3), and b is then in stage A. Clearances on both sides of A (Fig. 2) are automatically made by the actuating mechanism, to allow the supports in this stage to clear J and B for the elevator operation clearance. Pawls of music wire, secured under the panel 1, which are not shown in the drawings, lock the supports 2 from working backward at the stages B, D, E, I, and J; these pawls are arranged to let the dogs 7 bypass.

Figures 4 and 5 illustrate the article support's construction which is formed to comprise a tray or holder for holding pads, upon which pads the objects to be displayed are mounted. The dogs 7 are centrally and perpendicularly affixed or secured to the article supports, as shown, to follow in the slot 4, and washers 13 secured on dog 7, as shown, lock the supports in the slot. The recess 14 (Fig. 1) provides means for changing or removing the supports, since the washer 13 will pass therethrough.

Refer to Fig. 6, on which, for description, panel 1 is to be regarded as transparent, the abutment 5 and slot 4 being in evidence. Dogs 7 are shown in all positions, without showing the supports 2 which are assumed off of the panel. The elevator 3 is now shown flush with the panel 1, and aligned with the continuous slot 4. The levers to the pawls, and arrangement of the actuating mechanism, as further shown in Figures 7 and 8, are shown. Note that the posts 26 support the panel 1 on the base 25.

The levers 15—15, secured to a shaft 16 pivotally mounted on the base 25, operate the pawls 8 and 9 in unison, and are offset as shown in Fig. 8. The pawls 10 and 11 are mounted on a member 17 mounted to slide reciprocally on guided shafts 18 and 19, the shaft 18 carrying pawl 10 being adjustably clamped to the member 17.

To provide the clearances, referred to previously, on both sides of stage A, the fingers 20 and 21 are pivotally mounted under the panel 1, and actuated in timely manner by the pins 22 and 23 which are adjustably secured on member 17, as shown in Figs. 6 and 7. Finger 21 has a return-spring; 20 does not require a spring return.

See Figure 7. A bracket 27 has a bearing with a shaft 28 to which shaft is secured, by key, an elevator cam 29, which cam acts in engagement with a roller 30 and thus operates a bellcrank 31, which bellcrank 31 is pivotally mounted on a pin 32 and connects to a rod 33, which rod or link 33 is pivotally connected to the lever 34, as shown. This lever 34 is pivotally mounted on bracket 27, which bracket extends to effect such pivotal support as shown. Lever 34 connects to lever 35 as shown, which lever 35 has a wrist connection to rod 36 and connection through a fork 37 to bearings on the bottom end of tube 38, which tube is round and permits telescopic tubing 66 to turn within its walls as later to be described. The rod 36 pivots on base 25. These levers and bellcrank are preferably made of Duralumin to reduce weight, and lever 35 more preferably is of hardwood to absorb and break vibrations. A member 39, in the form of a crotch, is secured to the top of tube 38, and serves to guide the upper end of the tube between the vertically-held guide rods 65, 65; and has a thrust bearing for an elevator turntable 3, Fig. 9, which platform 3 has the slot 4 coincidentally arranged therethrough. The portion 40 of platform 3 revolubly bears on crotch 39; ball bearings might be used but are not necessary.

On the bellcrank 31 is a hump or roller 41, Figure 7. On the inside of the cam 29 is a hump 42. These humps coact and serve to make cam 29 positive on bellcrank 31. A counterweight 43 on a cable 44 operates on a guide, over a pulley, connected to lever 34 as shown, to counterbalance the weight of these levers and the elevator. By following out the curves of cam 29, and its complement 42, and following out the motions resulting therefrom in the references 31 to 38, it is evident that a multiplied vertical straight line motion say of about 13 or more inches for an inch of cam drop, may be produced on an elevator which lowers to exchange the supports 2; and is capable of carrying merchandise to the top of its stroke, holding it there, and then lowering the article support of merchandise for an exchange. The cam curves are changeable, and attached adjustable humps may be used, hence the motions on the elevator actions are "psychologically" adjustable.

In conjunction with the elevator motions, the lever 34 operates an adjustable rod 46 connected by universal joints to bellcrank 47, which bellcrank 47 changes the vertical motions to crosswise horizontal by means of link 48, to operate levers 15, 15, and thereby pawls 8 and 9 are operated, as shown in Fig. 8. Both end levers 15, 15, on shaft 16 coact with the elevator, and thus, when the elevator is lowered stage C is vacated, and when the elevator is raised stage H is vacated, in the timely relation heretofore described, to provide successive transfers of the article supports.

Mounted securely, to cam 29 is cam 49, by three screws as shown. Cam 49 has a positive hump 51, secured to cam 29. The roller 50 is engaged, as a cam follower, on cam 49, so that lever 52 which pivots on pin 32 is driven, driving the connecting rod 53, and the member 17, operating pawls 10 and 11 in timely relation with the actions of the pawls on the levers 15, 15, so that the article supports will be shifted through the stages over the panel 1 as before described.

Pin 54 projects downwardly, adjustably secured on member 17, Fig. 7. Pin 54 projects through a slot in the end of the rack 55, which rack is supported in a guide 56. Screw 57 is an end-play adjustment to limit the play of pin 54 in the said slot, or is an end adjustment of the rack application. The guide 56 is supported on bracket 27. The gear 58 is in engagement with the rack. As the member 17 reciprocates the rack 55 rotates the gear 58 back and forth, on the shaft 59, driving the ratchet coupling 60, so that the motion imparted to the lower part of shaft 59 is in one direction only, driving the gears 61 during the time the elevator is up, during which time the row of rear supports 2 are being moved, in clearing stage D. A telescopic shaft 66 extends from gear 61 (Fig. 9), up through tube 38 to the elevator platform member 3, or to member 40 thereof, so that said platform has connected means for providing the turntable action.

Conical dowels 63 on trip levers, as shown in Fig. 9, protrude up through holes in the platform 3 to engage and lock the article supports 2 upon said platform, which article supports have conical recesses 64 (Figs. 4 and 5) for receiving the dowels. Springs normally keep the dowels 63 in locked position but when the platform 3 is down flush with panel 1 the dowel levers have been interposed by blocks 71 and the supports 2 are released and transferred, while so unlocked in stage A.

The table or platform 3 has collector rings 75, on member 40 thereof, wired to insulated contacts supported in the table 3 which are in contact with electrical contacts 210 and 211 when the article support (Fig. 5) is on said platform 3. Wiring 76 extends down along the tube 38 and along the levers to transformers or to the wiring terminal block. Contacts 210 and 211 are convenience outlets so that in this way the article supports are energized for ready individual hookups, for demonstration purposes.

To lock the platform 3 from turning, when the elevator is in operation as an elevator, a projecting catch 69 secured to revoluble member 40 is caught and held by a latch 70, which latch holds catch 69 in a niche under spring pressure, and is operably mounted on a prong of crotch 39. To restrict the article supports from going past the center of platform 3, when being transferred to said platform, the music-wire prong 68 subtends, stopping the dogs 7 as said dogs reach the center of said platform.

In Fig. 9, the elevator is bared to view in its elongated position, showing a partial interior view of the machine, with merchandise objects 142, comprising an electrical searchlight with a doll, on an article support in stage J, which is just on the other side of the elevator in this view. Guide rods 65, 65, are secured to a frame 113, (Fig. 15). Between these guide rods, and between stages J and B is the elevator shaft; merchandise 142 has adequate room and clearance to enter this elevator shaft and to be elevated; and when elevated can be rotated on the platform 3. The objects can then descend and pass on the next stage, B. Note the U-irons 6 which bridge the slot or raceway 4 to hold the panel 1 in one piece, four such U-irons are shown in Fig. 6. The telescopic shaft 66 is made of lengths of square tubing telescopically interlocked, and these have oiling means when they dip into horn oil in the chamber 74. Note the construction of the panel 1 where the legs of the crotch 39 drop into recesses to permit the platform 3 to become flush with panel 1 for the transfer of objects from and to the elevator. The clip 67 is a stop-member to prevent gears 61 from lifting out of their lower bearing.

Figures 9 and 10. A gear box 72 is adaptably mounted in the shaft line 59, and provides means for automatic or manual settings to procure special appropriate motions to the turntable 3—in this case the motions are for high speed, low speed, neutral, and reciprocating motion.

A spring pressure brake 79 holds the lower section of shaft 59 so that ratchet disturbance is not communicated to the shaft. The ratchet as shown endwise in Fig. 11 has a pawl 60 which catches in a tooth 77 under pressure of spring 78.

Shaft 59, in Fig. 10, stops in bearing 82, whereby means of the gear secured to it the gear 81 is driven which drives the shaft 80, which shaft 80 has gears 84 and 85 and crank 87 secured to it as shown. A sliding gear-block 86 comprising high and low gears, slide clutch collar and clutch means is splined to shaft 83. A crank 88 with a complemental opposite portion of said clutch means is mounted freely on shaft 83. Connecting rod 89 connects both cranks, Figure 12. Shift lever 73 is operably connected to collar 86 and operated by a rod 90, which rod 90 facilitates control of the turntable mechanism, as to the actions to be generated thereby. Reciprocal motions and the extent thereof is dependent on the ratio of the cranks (Fig. 12), as shown by arrows, and when the clutch is engaged this motion is transmitted to shaft 83 via the splining on block 86. This reciprocal motion might be multiplied by gearing. The profile edges of the change gears may be chamfered sufficiently to insure meshings thereof.

In Fig. 13 a wheel 95 has nine equally-spaced holders 92, said holders holding adjustable cam prongs 93 by thumb screws as shown. The disc or wheel 95 is graduated with index markings along each of the prongs 93 to correspond with positions indicated by the pointers 94. Lever 91 has an offset cam blade which falls in the line of travel of the prongs 93, so that the prongs which are intermittently turned to successively operate said lever 91 will automatically set the lever out as far as the prong in contact is set. The control rod 90 joints rod 73 between the gear box and gear changer, see Figures 10 and 13. The wheel 95 makes one-ninth turn for every performance in the active stage, thus setting the gears for the performances as predeterminedly selected.

See Figures 6 and 8. Electric motor 96 drives balance wheel 98, which balance wheel is freely mounted on a highspeed shaft 102 of the gear reducer 103. A pin 99, secured to a spoke of wheel 98, projects so as to engage a toggle lever 100, which toggle is provided with a jointing therein buckled by a spring 101. One end of this short lever 100 is fixedly secured to the end of the shaft 102, the pin 99 presses against the toggle, driving said shaft 102, with the balance wheel now engaged thereby on its shaft. Undue load on said shaft 102 causes the toggle to break, the pin 99 then has lost its holt thereby permitting the wheel 98 to run idly until the toggle is again reset, thus protecting the machine, and protecting the merchandise from crushing or breakage in the event of any disruption of the cycle of operations.

A gear reduction unit 103 operated by a motor 96, the latter being a synchronous motor for synchronous duty in cases where it is imperative as elsewhere hereinafter described, is arranged to gear the cams 29 and 49 down to say less than one R. P. M. The spur gears 104 and 105 are interchangeably mounted to change the cam speed at will. Reducer 103 is mounted on bracket 27, the bracket being branched out to be clamped by studs between the reducer unit 103 and the bosses shown of the base 25. It is anticipated to make one unit of the reducer, motor, the bracket 27 and base 25, to serve as a housing and support for the rest of the structure of the display unit. A cooling fan on the motor may be used to keep the entire machine ventilated.

The general chassis is enclosable in a fireproof steel case made of a pan 106 having hinged front and rear doors 107, 107, Fig. 8, said doors having flanges to lock into the end doors 108, 108. See Fig. 14. Said case is mounted on casters 109, reenforced by angle-iron 110, and a steel cover 139 (Fig. 16) is provided for shipping purposes.

See Figures 14 and 15. Holders 111 comprise tubes welded vertically into the corners of the machine case having insertable stop pins 112 as shown. A rod framework designated by the reference numerals 113—113 (Fig. 15), makes a box frame which is supported at the holders 111 by pins 112. The guide rods 65—65, are also supported from said structure shown. By pulling pins 112 said frame 113 is permitted to collapse, for folding the machine. Over this frame 113 a changeable canvas cover 114 is hung, when the machine is set up for use, said cover having aperture 115 for signs which are to appear therethrough, and having an aperture in the place where the elevator projects the articles and article supports through the top of the machine. Obviously this can be made into a light foldable structure, the accessories like the cover 114 may be placed in the cover 139, and the unit may be transported or stored in its protecting case, Fig. 16.

See Figures 8, 14, and 15. A disc 116 of wood or metal is mounted on a hub 117; which hub, has equally-spaced dogs 118 fixed thereto, is mounted to rotate on an axis 119, between the machine chassis and front door 107. A guiding clasp 120 assists in spacing the disc 116 and holds it from overrunning; further guides 121 receive the disc around its periphery to space the same, as shown.

To actuate this disc 116 which is provided to carry signs to appear in aperture 115, a crank 122 is adjustably fixed to the end of shaft 28, driving a connecting rod 123 which rides in a guide and which intermittently turns the disc 116, one-ninth of a turn each time the crank 122 makes a revolution—the rod 123 engages the dogs 118 as shown, Fig. 14.

See Figures 6 and 14. Lever 124 actuated by the pin 125, which pin is screwed into the web of gear 105, pushes and operates rod 126, and spring 127, and provides a reciprocal motion having a spring return. The cord or cable 128 tied to spring 127 operates through eyelets 129—129, and actuated bellcrank 130, Figs. 14 and 15, as shown. A wire frame 131 having a black velvet slip-on cover or such, operates pivotally on brackets 132 so as to act as an operable closure over the elevator shaft aperture. A lever subtends down to coincide with bellcrank 130, this lever is secured to 131 and a light spring 134 is mounted thereon which tends to keep the door 131 upright and open. A cord or cable 133 connects this door or closure 131 with the crank 130 as shown, so that when the lever 124 is engaged by pin 125, Fig. 6, the closure 131 is closed down over the aperture, or over its equivalent.

Figures 14, 15, 16, and 25 show a dome 135, made of light framework, and cover to match the closure 131, having a rectangular aperture in its top for objects to come through when the article supports are elevated, and having an annular skirt over the framework circumferential rim. This dome rests freely over the elevator shaft with its aperture aligned coincidental with the elevator aperture on the cover 114, and is centered by the annular flanged guide 136, Figs. 14 and 15. Figure 14 shows, by dotted lines, the path of an article support 2 in the elevator shaft from panel 1 to the said dome. The article supports lock into clips 137 temporarily while elevated, which clips have a guiding effect to fit the dome carefully over the article support, coincidental with the aperture, and concealing the table frog 3 and mechanism therewith. The objects are thus displayed on the dome, and when the table 3 turns the dome turns producing the turntable effect.

As the object is elevated by the elevator shaft it touches the closure 131, this upward push causes the closure to open freely, but it is not opened by the spring before, because the weight of the closure is slightly more than the tension of the spring 134. Once the closure begins to open the spring 134 pulls it to full open position slightly ahead of the object which is then brought into display position. Said closure then becomes an immediate background for the object display, being a soft black velvet. In addition a sign in back of the closure 131 is now covered by the closure, which sign appears when the object has gone down and the closure has closed.

The foregoing descriptions have related to the construction and operative details of an integral object display device which, when further correlated with other apparatus forms a more integral combination, producing a far more complete and newer and better result, in meeting the requirements of the objects of this invention. The object display, sign coordination therewith; changes of the displays, display motions, and combinations, demonstration means, and facilities for their practical use have been described. Similar characters of reference referred to similar parts and portions throughout the several views of the drawings as is customarily done.

In further reference to the drawings Figures 17 and 18 show a sound reproducer which provides the sales talks that are needed for producing sales, with the showing and demonstrating of objects. A case 143 has hangers 144 and resilient legs 145. A motor 146 is centrally mounted on said case 143 with an appropriate turntable 147 operably mounted thereon in arrangement with an air-column sound reproducer 148. An additional motor 149, of sufficient starting torque, is shown, having a windlass 150 arranged to wind and unwind a cable or cord 151 which cord works through pulleys 152, 152, and is connected to a hinged bar 153 having a weight 154 at its extreme free end. When motor 149 is temporarily energized the windlass 150 pulls upward on the free end of bar 153 thus forming an incline; which incline being formed under the reproducer element laterally as shown causes the reproducer column 148 to be lifted and to slide down the so formed incline to the starting position of the record arranged for. The motor 149 then becomes disenergized, having been only momentarily energized, and the weight 154 plus the weight of the reproducer element 148 pulls the bar 153 down against the inertia of the motor armature into horizontal position to permit the reproducer to travel on the record 157. The bracket 169 supports the horn 155 and column 148. Note that in Fig. 17 the rear side of case 143 is shown removed. In Fig. 18 the top of the case should be assumed transparent. A hinged door 156 is provided for inserting and removing records. A door 158 provides needle changing access.

A member 159 mounted to swivel on a pin 160 projects between two prongs of switch 161, Figs. 18 and 19, which switch pivots over a center pin 162 and is a movable contact which closes and opens the circuits through fixed contact 163—the reproducer column 148 rides within the saddle of member 159 causing said member 159 to actuate the closing of the said switch when the record has been played, which switch closing causes motor 149 to be momentarily energized causing the described action of column 148 which now operates 159 reversely causing the switch to be snapped open. Fig. 19 shows a sectional view of this repeat switch. Spring 171 gives toggle action to the switch.

An additional switch 164 is arranged to be used when the repeater switch is not used. A projection 168 extends from the column 148 which actuates the opening of switch blade 165 from blade 166, opening the circuit of motor 146 with which this switch is in series. When the reproducer is lifted over to the start of the record, spring 167 closes blade 165 to 166, and motor 146 is thus started and run.

In the needle door 158 a gage rod 170 is slidably affixed to set the stop feature thereon which causes the reproducer to be stopped at the starting point of the record, where the reproducer is let down by the windlass 150 as described.

See Figure 14. The pushrod 126 in guide 176 has a pawl operating ratchet wheel 172, to which wheel is secured an offset arm 173 coincidentally engaging a movable contact 174 on each revolution of the wheel 172, said movable contact 174 having a pin extending therefrom at its outer tip for the arm 173 to act upon sharply in time and action, to cause a circuit to be closed and opened within the time that the said wheel has operated one tooth or one-ninth revolution. A stationary contact 175 is thereby acted upon. The blade 174 is here made of spring brass and mounted tangentially across the face of the wheel 172 to hold said wheel fixedly between operations of the pawl 126—the teeth of the wheel do not close the switch, and the wheel is mounted on insulation. This switch closes momentarily, and is a remote control switch for correlated apparatus and the sound reproducer, acting as a synchronizing switch for the automatic sound reproducer described.

Apparatus for the synchronous recording of records for use in the synchronizable sound reproducer will now be described. In Fig. 20 a translucent printed form having title and instructions heading, 177, having nine rectangular divisions ruled thereon each of which are ruled into five subdivisions, each of which subdivisions are ruled with blank space lines, is inserted in a slot between the case 178 and the lid 179. The case 178 has partitions 180 and 181 corresponding to the spaces on the form 177, and within such spaces has small electric light bulbs 182 wired separately for individual lightings thereof. The lid 179 is flanged to fit tightly and to lock on to the case 178, the upper flange being cut away to provide a slot for sheet 177.

Figures 22 and 23. The distributor for the wiring to the forty-five lamps 182 has forty-five segments 185 for individual connections to said lamps. The brush shaft 187 is geared or connected to synchronize with the recording stylus feed screw of the studio apparatus where records are made or recorded, so that the brush 188 will contact all segments 185 which are designed or arranged to be passed over in synchronism with the movement of the said recording stylus, in time with the progress made in the progress of recording. Such segments correspond in lengths of arcs and order to the partitioned spaces of the case 178 so that when the brush 188 is rotated at a constant speed the lighting of bulbs 182 will be synchronous with the displays. It will be noted that the first space of each group of five as shown is greater than the four succeeding spaces, the arcs 185 correspond in the arrangements. These relations remain constant but are adjustable, the partitions 181 are slidable to adjust the spacings to correspond to the form 177. The segments 185 are interchangeable and made up of die cut laminations so that the proper corresponding lengths of arcs can be arranged on same to also correspond with form 177. Mica laminations are insertable between the distributor segments to divide the spacing as required.

Section z—z, Fig. 22, is shown in Fig. 23. The distributor housing 183 has an annular ring 184 in its bottom and the cover 191 has a similar ring 184 oppositely aligned. The outside flange of housing 183 forms an outside ring to contain the segments 185; and is lined with insulation or made of Bakelite, similarly to cover 191. The housing 183 has a graduated scale on the rim of the outside ring to mark off or indicate where the mica lamination stampings, which are of a shape adapted to fit the housing receiver, are to be placed for gaging the light timing. The partitions 180 of the light-box are also graduated, to correspond with graduations on the distributor. Cover 191 has a central hole with a brush wiper terminal 190, this cover is held in place by clips 192 and locks the laminations 185 therein, as shown in Figure 23.

The base 186 supports the distributor which may be mounted on the recording machine where shaft 187 is adapted by appropriate means to operate at a speed synchronous with the recording operation, this may be geared direct to the recording feed elements. The circuits are made through the segments from the brush 190 to and through the respective lamps described. An annular aperture is provided by the space 189, between the housing 183 and cover 191, for distributing the wire conductors from the segments 185. These wires may be pinched between laminations or attached to some of the laminations.

The first major space (Fig. 20) shows the lines in blank, on form 177, upon which words for recording are to be written. All spaces contain these blanks, equally spaced, so that the number of words per space are proportional directly to the space size and the time element. In practice the manuscript is written in time stages, corresponding to the developments with which it is to be synchronized. The recording process is designed therefore to act specifically in unison, integrally with the correlated and dependent apparatus. The manuscript is read off in the recording studio in synchronism with the illumination or showing of the text matter as described, so that the talk is distributed over the record in accurate synchronous timing.

Fig. 24 is the wiring diagram layout. The alternating current is obtained through a convenience receptacle plug 193; hand switch 194 controls the feed to the machine apparatus; dotted outline refers to the display unit as of Fig. 14. Terminal block 196 has a condenser 197 shunted across the main circuit for elimination of interference with nearby radios. The wiring 76 referred to in Fig. 7 to elevator 3, is shown as 198 of this diagram, 199 being a 110/6-volt transformer; 200, a neon lighting transformer; 201, a control switch for the sound reproducer; 202 refers to a three-prong convenience receptacle for the sound reproducer apparatus, two wires being the power feed of which the neutral is a common return and the third wire is the synchronizing wire; 203 is a double-pole double-throw switch for changing the sound control from intermittent synchronizing to straight repeat; 204 is an electric pickup for the sound reproducer; 205, the repeat switch as of Fig. 19; 206, 206, are receptacle plugs for the amplifier pickup and power circuits for use when the pickup 204 is substituted for the air-column reproducer; 207 is the amplifier unit; 208, the loudspeaker. The dotted outline 143 refers to the sound reproducer unit shown in Fig. 18. Various other apparatus may be attached in timely or synchronous relation.

Numeral 209 refers to decorative backgrounds and arrangements 212, 212, are sign cards on which indicium are shown related to the indicium on the signs of 116, together with signs not shown on the said revoluble element.

Neon or gas-tube lighting may be used bordering segregated features of the machine or display,—say a circle of tubing behind and outlining frame 131 (Fig. 14); similar lighting bordering the aperture 115; a background 209 similarly set off, and an outline of the machine. An electrical distributor may be geared to the machine to control such lighting (Fig. 22), for correlated and synchronous applications. Such lighting in various colors may also be controlled by the distributor; it is within the spirit of this invention to at times have independent shelves or supports with objects thereon focused upon or set off by lights, on the sides of the machine, or all over the window if wanted, controlled by a synchronized distributor energized from the voltage desired; and the sound reproducer synchronized to cooperate; said shelves might be turntables, and cooperating signs may be arranged therewith under the influence of said lights.

*Operations*

Figure 25 shows the machine set up, at a store.

The motor 96 operates cam shaft 28 say at accurately two revolutions per minute. Cam 29 raises the elevator in stage A, with a movement simulating a courteous appealing presentation simulating a clever salesman. During this raising action the levers 15, 15 are moved toward the front, pawl 8 filling vacancy I, the lever 34 having pulled up on link 46 operating bellcrank 47 and by link 48 pulling the levers 15, 15, forward; the closure 131 has opened, the object is on display and is now being demonstrated, if it is the searchlight 142 the wiring is energized as described, the searchlight is in operation; immediately below, the sign in aperture 115, has visual descriptive matter relating to the object, at the same time a synchronous sales talk relates to each feature of the searchlight as it is turned around and the features shown, this talk being audible at the place where the prospects are looking at the display. Additional objects elsewhere in the windows are illuminated and referred to, halos of lights of various colors setting off the searchlight on the dome 135.

The cam 49 now advances the lever 52 operating slide 17, pawl 10 pulling article supports filling vacancy H and vacating D; the pin 54 pulls the rack 55, the said searchlight is turned around or reciprocated with the light therefrom beaming out and showing its focus or value; as the slide 17 almost completes its leftward stroke the pin 22 engages the finger 20, which finger engages the dog 7 of an article support in stage J and presses it against I to provide clearance on that side for the elevator to descend, there already being a clearance on the other side of A.

Cam 29 has now turned to where the elevator is in descent, the positive cam 42 assuring this against the counterbalance 43, the elevator levers and tubing collapse or fold, the levers 15, 15 reverse at the same time causing pawl 9 to vacate C and filling D, resetting pawl 8; during this time the catch 70 keeps the elevator and turntable in alignment for the descent. Now the dowels 63 are unlocked while the article support rests on the panel, the circuits to the turntable are opened by the timing of the distributor thereto, the closure 131 is pulled closed by means of lever 124 pulling cord 129. The crank 122 now pushes rod 123 against dog 118, the sign changes in aperture 115, the lever 124 operates rod 126 setting the sound reproducer control one-ninth turn ahead, rod 90 sets gear box 72 for the next display, and meantime the distributor sets off other objects with lights while the talks refer to them; slide 17 reverses, pawl 11 transfers the front supports 2, vacating I, filling C, and transferring a new display into the stage A, while pin 23 engaged finger 21 forcing the article support in B to provide the clearance later required for elevator descent between B and A, and rack 55 moved into its guide resetting the turntable rack driving means. The cam 29 now again elevates the turntable 3, the counterbalance 43 assisting in lifting the elevator, while the article support in stage A is locked to the elevator, the levers 15, 15 are co-acting, the closure 131 is again touched and opened, and new displays and demonstrations of objects are performed one after the other, with special audible talks and appropriate combinations exercised, a new display every 30 seconds, for a series of nine.

Every nine revolutions of shaft 28 all article supports have been displayed, the momentary contact 174 has been made and broken to start the sound reproducer automatically synchronously for the series. The switch 203 is closed to the right, switch 201 is alive, at every operation of contact 174, which occurs once in the series of displays, the windlass 150 is operated resetting the reproducer, in synchronism with the displays. This synchronism is maintained accurately by the use of synchronous motors, 96 and 146.

In this present age municipal governments have tried to regulate the use of sound apparatus in business districts of cities, in so doing have prohibited rather than regulated, for the reasons that the sound advertising such as public address systems has been a deterrent to traffic regulation and construed as a public nuisance. I overcome this fault in the use of sound in my operations by the use of decent modulated controlled and focused limited street sound apparatus to induce cities not to overtax the most effective business recovery means, and to also encourage efficient and proper merchandising machinery usage, this is done by having the sound apparatus no louder than is necessary at the location where it is to be heard, having the horn 155 directed in the direction in which the sound is to fall, having a muffler on the horn, or distributing the sound from inside of the window glass preferably by an armature connection from a loudspeaker to the glass, using the window as a diaphragm, using a padding against the glass to overcome crystallization or shattering, or having the sound reproducer mounted inside of the display unit where space therefor has been provided. Control is further provided in the sound reproducer by reason of the fact that when sales are to be intelligently effected there must not be too much talking, silent intervals should be given, this is effected by running some of the displays silently at will using only the sign description means during these intervals, by say using a two-minute recording which terminates itself by opening switch 164 and is restarted only when the series of displays are renewed, or a distributor in the sound reproducer control circuit may open this circuit for periodic intervals while shaft 28 geared-down to the distributor operates. These intervals of silence also save records, as well as disperse crowds, and appease the public at times, as well as form new crowds when the sound again is in operation.

A special synchronizing bar may be adapted laterally under the column 148, which is axially mounted alongside of bar 153, having V-cuts along its length, to which a knife-edge protrusion under the column 148 is adapted, such protrusion seating in the V-cuts when this synchronizing bar is turned up by an actuating means, thus the reproducer could be lifted at the end of each individual display and when let down again the reproducer would be centered in the V-cut over which it last had been to synchronize sharply with that display, then travelling over the record over the next V-cut for the next interval and synchronization.

The objects show from a wide angle of view on top of the dome, the crowd tends to spread out along the window where it not only can see the objects on display but can also hear the talks and does not tend therefore to form an apex out across the sidewalk to obstruct pedestrian traffic, but also is comforted in not having to crane and strain and crowd to benefit from the display.

The remote control synchronizing switch and the repeat control switch may be wired to cooperate with each other in their joint use.

A large department store may have any number of display machines in distributed locations, similar in all respects with similar series of similar displays, all operated synchronously with synchronous motors, with but one automatic synchronizable sound reproducer synchronized to one of the synchronized display units, and the sound may be delivered to the proximities of the displays by a plurality of loudspeakers wired from amplifying units fed by the sound reproducer. Microphones might be connected to feed in personal talks at intervals. Radio broadcasts may be connected into this system.

While talk-back recording in the field may be used, the pure durable electric recordings of the studio may be operated in these display setups, the manuscript of the talk is typed at the displayman's office in collaboration with psychologists and sales engineers and sent to the recording studio where the described manuscript synchronizer or synchroscope is employed, with the use of the form 177.

When the display unit described first brings an article to display the front view is usually shown first, then with the use of the turntable a side view is shown, then the rear view, the other side and again the front, at which time the article goes downward from view; in the recording of the record each of the nine major divisions of the text matter on 177 refer severally to the objects, on the article supports, series a, b, c, d, e, f, g, h, and i, to each respectively, and in the same order; the subdivisions of the text of 177 refer chronologically to the different positions or views or features of the objects or demonstrations such as front view, side view, rear and so on as related, therefore the timing is taken into account relative to the display unit activity and the words are supplied to the form 177 in accurate relation and synchronism with the analyzed activities, all of which are predetermined.

The case (Fig. 16) being collapsed, will pass through narrow doors and windows. In installing the apparatus it is located and the display element opened up, the cover 114 is placed, merchandise pads are loaded into the article supports in the magazine therefor, the prepared signs are fastened to the sign carrier 116, which sign carrier is hinged in the case in such a manner as to fold when not in use, and the sign carrier is inserted or placed in its place in the machine. The sound reproducer is loaded with a synchronous record, hung up and wired, a permanent needle is installed, the dome 135, cover 114, signs 212, 212, background 209, neon lights, electric distributor and other features are lined up and adjusted; then the machine is switched on, or a time-switch is connected, to run it at the long hours of duty even after the store has closed.

Obviously many attachments are now easily anticipated, which the mechanics can adapt. Reference is made to my previous patent applications: Ser. No. 122,442, filed July 14, 1926, for Automatic advertising machine; Ser. No. 141,220, filed Oct. 12, 1926, for Educational, amusement, or advertising devices; Ser. No. 293,137, filed July 16, 1928, for Sales arcades; and joint-inventor applications, Nos. D-74,732 and 188,599½ filed in 1938. Application Serial No. 251,974, filed Jan. 20, 1939, for Display machinery, which is a full continuation in part of this (above entitled) application.

Obviously there are many modifications to this invention. I do not desire to be limited to the specific form shown. Most any objects can be adaptably displayed within the principles of this invention. Therefore, the scope I claim is broad; the objects of this invention appear to be met and provided for.

I claim:

1. The combination, of an automatic educational or sales machine for displaying and demonstrating articles of merchandise, means for periodically displaying objects, and automatic sound reproducing means for giving sales or educational talks synchronized with said displaying means.

2. The combination, of an automatic educational or sales machine for displaying and demonstrating articles of merchandise, means for periodically displaying objects, and automatic sound reproducing means for giving sales or educational talks synchronized with said displaying means, and cooperative means for showing signs for imparting visual knowledge about said articles.

3. In apparatus of the class described, a predetermined synchronized sound recording, means for automatically displaying or demonstrating objects and automatic means for synchronizing the predetermined synchronized sound recording with the display means.

4. In apparatus of the class described, an automatic sound reproducer, a sound record having a synchronized sales talk recorded thereon, means for synchronizing the recording, automatic display or demonstrating means for displaying or demonstrating objects, and means for synchronizing the sound reproducer with the display or demonstrating means.

5. In apparatus of the class described, a support carrying an article, means for bringing various features of the said article sequentially to view, sound reproducing means relating to the features of the article, and means synchronizing the sound reproducing means with the means for sequentially bringing features of the article to view.

6. In apparatus of the class described, a plurality of supports, carrying articles; means for bringing each of the supports separately to view for demonstrating the articles individually, means for bringing various features of each article sequentially to view, sound reproducing means relating to the features of the articles, and means synchronizing the sound reproducing means with the means for bringing each of the supports to view and with the means for bringing various features of each article sequentially to view.

7. In apparatus of the class described, a conveyor having a plurality of article supports, sound reproducing means relating to articles carried by the supports, and means synchronizing the sound reproducing means with the article support conveyor for audibly referring to or describing the article carried by a specific support.

8. In apparatus of the class described, a plurality of platforms arranged to be brought to view individually, platforms having electrical connecting means so constructed and arranged as to electrify electrical apparatus placed on such platforms, and sound reproducing means relating to the electrical connections and synchronized therewith in the demonstration of merchandise on said platforms.

9. In apparatus of the class described, a plurality of supports for supporting articles of merchandise, lighting means for illuminating each of said supports in sequence, means for describing each of the articles on said article supports in sequence when the same are illuminated, and means synchronizing the article describing means with the illuminating means for effecting illumination of the article described.

10. In an apparatus of the class described, an automatic display mechanism, an automatic sound reproducer, said sound reproducer being so constructed and arranged as to be automatically remotely controllable, and synchronizing means in said display mechanism for controlling the sound reproducer.

11. In apparatus of the class described, an electric motor driving a conveyor, an electric motor operating a sound reproducer, with means for synchronizing the actions of the two motors.

12. In apparatus of the class described, an automatic display mechanism, an automatic sound reproducing means, synchronizing means, and means for delivering the sound from said sound reproducing means to any suitable position of location relative to said display mechanism.

13. In apparatus of the class described, a horizontal conveyor having display supports, an elevator synchronized therewith for elevating the supports one at a time into display view, and cam driving means for imparting motions to the elevator.

14. In apparatus of the class described, an elevator arranged to receive and unload article supports, automatic means for locking the supports to the elevator in their ascent and descent, and means for unlocking the said supports for unloading the same from the elevator.

15. In a machine of the class described, automatic means for displaying or demonstrating objects, automatic means for changing motions to be imparted to the objects to be displayed or demonstrated, and manual means for setting the latter automatic means so that demonstrating or display motions to be imparted to the objects can be predetermined.

16. In a machine of the class described, automatic means for displaying or demonstrating objects, automatic means for changing motions to be imparted to the objects to be displayed or demonstrated, and calibrated manual means for setting the latter automatic means described.

17. In a machine of the class described, a collapsible enclosure, and a collapsible article conveyor mechanism fixedly mounted therein, said mechanism being expansible with the enclosure for periodic display, outside of the enclosure, of articles carried by the conveyor when expanded.

18. In apparatus of the class described, a conveyor having a plurality of article supports, means in connection therewith for displaying one of said supports at a time, sound reproducing means relating to the articles carried by the supports, and means synchronizing the sound reproducing means with the article support conveyor for audibly referring to or describing the article displayed.

19. In apparatus of the class described, a conveyor having a plurality of article supports, a second conveyor synchronized with the former conveyor and provided with display signs, designated signs being related to and capable of being displayed with the article carried by the corresponding support, sound reproducing means relating to articles carried by the supports, and means synchronizing the sound reproducing means with the article support conveyor for audibly referring to or describing the article carried by a specific support.

20. In apparatus of the class described, a conveyor having a plurality of article supports, means in connection therewith for displaying one of said supports at a time, a second conveyor synchronized with the former conveyor and provided with display signs relating to the articles carried by the supports, sound reproducing means relating to articles carried by the supports, and means synchronizing the sound reproducing means with the article support conveyor for audibly referring to or describing the article displayed.

21. In apparatus of the class described, a conveyor having a plurality of article supports, means in connection therewith for displaying one of said supports at a time, a second conveyor synchronized with the former conveyor and provided with display signs, designated signs being related to and capable of being displayed with the article carried by the corresponding support, sound reproducing means relating to the articles carried by the supports, and means synchronizing the sound reproducing means with the article support conveyor for audibly referring to or describing the article displayed.

OTTO HENRY SCHOENBERGER.